United States Patent
O'Gorman et al.

(10) Patent No.: US 11,354,485 B1
(45) Date of Patent: Jun. 7, 2022

(54) MACHINE LEARNING BASED CLASSIFICATION AND ANNOTATION OF PARAGRAPH OF RESUME DOCUMENT IMAGES BASED ON VISUAL PROPERTIES OF THE RESUME DOCUMENT IMAGES, AND METHODS AND APPARATUS FOR THE SAME

(71) Applicant: iCIMS, Inc., Holmdel, NJ (US)

(72) Inventors: Eoin O'Gorman, London (GB); Adrian Mihai, Dublin (IE)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 17/319,894

(22) Filed: May 13, 2021

(51) Int. Cl.
| | |
|---|---|
| G06F 17/00 | (2019.01) |
| G06F 40/103 | (2020.01) |
| G06K 9/62 | (2022.01) |
| G06F 40/197 | (2020.01) |
| G06N 20/00 | (2019.01) |
| G06Q 10/10 | (2012.01) |
| G06F 40/169 | (2020.01) |
| G06V 30/414 | (2022.01) |

(52) U.S. Cl.
CPC .......... *G06F 40/103* (2020.01); *G06F 40/169* (2020.01); *G06F 40/197* (2020.01); *G06K 9/6256* (2013.01); *G06K 9/6262* (2013.01); *G06N 20/00* (2019.01); *G06Q 10/1053* (2013.01); *G06V 30/414* (2022.01); *G06V 2201/13* (2022.01)

(58) Field of Classification Search
CPC .... G06F 40/103; G06F 40/169; G06F 40/197; G06N 20/00; G06K 9/00463; G06K 9/6256; G06K 9/6262; G06K 2209/50; G06Q 10/1053

USPC ......................................................... 715/229
See application file for complete search history.

(56) References Cited

U.S. PATENT DOCUMENTS

| | | | | |
|---|---|---|---|---|
| 6,470,306 | B1 * | 10/2002 | Pringle | G06F 40/58 704/3 |
| 7,689,431 | B1 * | 3/2010 | Carmel | G06F 40/253 705/1.1 |
| 8,620,078 | B1 * | 12/2013 | Chapleau | G06K 9/344 382/173 |
| 10,467,464 | B2 | 11/2019 | Chen et al. | |
| 2002/0116420 | A1 * | 8/2002 | Allam | G06F 40/106 715/273 |

(Continued)

FOREIGN PATENT DOCUMENTS

WO   WO 2017/214073 A1   12/2017

*Primary Examiner* — Jason T Edwards
(74) *Attorney, Agent, or Firm* — Cooley LLP

(57) ABSTRACT

In some embodiments, a method can include generating a resume document image having a standardized format, based on a resume document having a set of paragraphs. The method can further include executing a statistical model to generate an annotated resume document image from the resume document image. The annotated resume document image can indicate a bounding box and a paragraph type, for a paragraph from a set of paragraphs of the annotated resume document image. The method can further include identifying a block of text in the resume document corresponding to the paragraph of the annotated resume document image. The method can further include extracting the block of text from the resume document and associating the paragraph type to the block of text.

20 Claims, 5 Drawing Sheets

200

```
┌─────────────────────────────────────────────────────────┐
│ Generate a resume document image that has a standardized│
│ format, based on a resume document that has a set of    │
│ paragraphs 201                                          │
└─────────────────────────────────────────────────────────┘
                            ↓
┌─────────────────────────────────────────────────────────┐
│ Execute a statistical model to generate an annotated    │
│ resume document image from the resume document image.   │
│ The annotated resume document image indicates a         │
│ bounding box and a paragraph type, for a paragraph from │
│ a set of paragraphs of the annotated resume document    │
│ image 202                                               │
└─────────────────────────────────────────────────────────┘
                            ↓
┌─────────────────────────────────────────────────────────┐
│ Identify a block of text in the resume document         │
│ corresponding to the paragraph of the annotated resume  │
│ document image 203                                      │
└─────────────────────────────────────────────────────────┘
                            ↓
┌─────────────────────────────────────────────────────────┐
│ Extract the block of text from the resume document and  │
│ associate the paragraph type to the block of text 204   │
└─────────────────────────────────────────────────────────┘
```

(56) References Cited

U.S. PATENT DOCUMENTS

| | | | |
|---|---|---|---|
| 2013/0198599 A1* | 8/2013 | Kumar | G06F 40/177 |
| | | | 715/227 |
| 2014/0118560 A1* | 5/2014 | Bala | H04N 1/00466 |
| | | | 348/207.1 |
| 2014/0122054 A1* | 5/2014 | Takano | G06F 40/42 |
| | | | 704/2 |
| 2016/0026621 A1* | 1/2016 | Misra | G06F 40/30 |
| | | | 704/9 |
| 2017/0300565 A1* | 10/2017 | Calapodescu | G06F 16/278 |
| 2017/0300635 A1* | 10/2017 | Ganesan | G16H 15/00 |
| 2020/0019768 A1 | 1/2020 | Chen et al. | |
| 2020/0042837 A1* | 2/2020 | Skinner | G06F 21/62 |
| 2020/0193222 A1* | 6/2020 | Singh | G06K 9/6255 |
| 2020/0387744 A1* | 12/2020 | Wang | G06K 9/00671 |
| 2021/0049345 A1* | 2/2021 | Johnson | G06T 5/003 |
| 2021/0074425 A1* | 3/2021 | Carter | G06T 7/0012 |

* cited by examiner

200

Generate a resume document image that has a standardized format, based on a resume document that has a set of paragraphs 201

Execute a statistical model to generate an annotated resume document image from the resume document image. The annotated resume document image indicates a bounding box and a paragraph type, for a paragraph from a set of paragraphs of the annotated resume document image 202

Identify a block of text in the resume document corresponding to the paragraph of the annotated resume document image 203

Extract the block of text from the resume document and associate the paragraph type to the block of text 204

FIG. 2

FIG. 3 summary 90%

...professional with over 18 years experience as designer, brand manager and graphic/UI designer with global brands in online gaming, online casino, online sportsbook and design agency environments.

With a background in Product Design, I began my career designing and developing websites during the dot-com boom. I broadened my design and branding skills while working in agency environments and subsequently opened my own studio in 2002. In 2005, I joined Full Tilt Poker and spent 10 years mastering brand strategy & brand positioning, leading analytically-driven UI/UX and fostering world-class product design. I led our in-house design and copywriting teams and I liaised with external agencies and developers to create some of the most innovative branding and products to emerge from the online gaming sector.

I am highly-creative, self-motivated and concept-driven and my passion is creating innovative brand solutions and products. I am an avid reader on idea-generation, decision-making, cognitive biases, gamification, big data and the psychology of viral social media.

PORTFOLIO
Video showreel and samples of work at: http://www.karlbray.com/art-director-portfolio experience 81%

...(March 2015)

As Head of Design & Brand Services, my job is to tell the Full Tilt brand story. I work with marketing leaders to define brand strategy, devise brand positioning and execute creative that complements business strategy. I lead a team of designers and copywriters and I provide the brand vision and aesthetic direction that dictate how the Full Tilt brand is presented across a diversity of channels including television and print advertising, social media, video assets, TV programming, online promotions and live events.

I am responsible for creating Brand Guideline documents, brand architecture and brand assets. I modify and adapt and brand guidelines to meet new criteria and business objectives.

I define the UI/UX and Interaction Design for Full Tilts desktop & mobile poker software, web-based gaming platforms, casino games, sportsbook and other web-based gaming products, including all in-game artwork and promotional graphics. I manage the end-to-end production of all gaming projects; from customer research and paper-prototyping through to visual specifications, high-fidelity wireframes and pixel-perfect sprites. I collaborate with Product Analysts, Business Intelligence and software development teams to define new games and product features, and I formulate feature roadmaps and delivery schedules that ensure creative production is in line with development workflow.

I maintain a hands-on approach when required: I create online videos, advertising graphics, social media content, product wireframes, interactive prototypes and gameplay animation.

I work with external advertising and design agencies across Europe and America to ensure outsourced creative is delivered on time, on budget and according to brand guidelines.

In 2014, I worked alongside Cultural Strategy Group to define the repositioning of the Full Tilt brand. I took a lead role in rebranding the Full Tilt visual identity, including logo redesign. The rebranding earned an All Ireland Marketing (AIM) award in 2015 and led to a 20% increase in player revenue, a 290% increase in mobile sign-up and almost 100% increase in brand recall.

Our website redesign increased conversion rate by 26.2% and reduced bounce rate by 15.3%.

Dublin, Ireland karl@karlbray.com

+353 87 3637038 http://linkedin.com/in/karlbray

FIG. 4 x1, y1

> Lorem ipsum dolor sit amet, consectetur adipiscing elit, sed do eiusmod tempor incididunt ut labore et dolore magna aliqua. Laoreet sit amet cursus sit. Posuere lorem ipsum dolor sit amet consectetur. Vel facilisis volutpat est velit egestas dui. Adipiscing elit duis tristique sollicitudin nibh sit ameLorem ipsum dolor sit amet, consectetur adipiscing elit, sed do eiusmod tempor incididunt ut labore et dolore magna aliqua. Laoreet sit amet cursus sit.

BRIEF x2, y2 x3, y3

> Posuere lorem ipsum dolor sit amet consectetur. Vel facilisis volutpat est velit egestas dui. Adipiscing elit duis tristique sollicitudin nibh sit amet commodo. Elit at imperdiet dui accumsan sit amet nulla facilisi morbi. Velit laoreet id donec ultrices tincidunt. Mattis aliquam faucibus purus in massa tempor. Netus et malesuada fames ac turpis egestas maecenas pharetra convallis. Orci a scelerisque purus semper eget duis at. Tellus id interdum velit laoreet id donec ultrices tincidunt. Ut diam quam nulla porttitor. Justo eget magna fermentum iaculis eu. Tellus cras adipiscing enim eu turpis. Sollicitudin aliquam ultrices sagittis orci a scelerisque purus.

EXPERIENCE x4, y4 x5, y5

> Fusce id velit ut tortor pretium. Quis hendrerit dolor magna eget est lorem ipsum dolor sit. At ultrices mi tempus imperdiet. Semper eget duis at tellus at urna condimentum mattis pellentesque. Nisi lacus sed viverra tellus. Sem integer vitae justo eget magna fermentum iaculis. Eget lorem dolor sed viverra. Eu mi bibendum neque egestas congue. Semper feugiat nibh sed pulvinar. Dignissim enim sit amet venenatis urna. Dictum sit amet justo donec enim diam vulputate. Ipsum dolor sit amet consectetur adipiscing. Luctus venenatis lectus magna fringilla urna porttitor rhoncus dolor. Amet justo donec enim diam. Sit amet purus gravida quis blandit turpis cursus. Massa sapien faucibus et molestie ac feugiat sed. Lectus magna fringilla urna porttitor rhoncus dolor purus non. Sit amet mattis vulputate enim. Pellentesque nec nam aliquam sem.

EDUCATION x6, y6

Sapien faucibus et molestie ac. Adipiscing commodo elit at imperdiet. Et malesuada fames ac

FIG. 5

MACHINE LEARNING BASED CLASSIFICATION AND ANNOTATION OF PARAGRAPH OF RESUME DOCUMENT IMAGES BASED ON VISUAL PROPERTIES OF THE RESUME DOCUMENT IMAGES, AND METHODS AND APPARATUS FOR THE SAME

TECHNICAL FIELD

The present disclosure relates to the field of artificial intelligence, and in particular to apparatus and methods for training a statistical model for classifying and annotating paragraphs of a resume document images based on visual properties of the resume document images.

BACKGROUND

Classification of paragraphs of resume documents can be useful in many applications. For example, classification of paragraphs of resume documents can be helpful for a company's human resources team, a networking social platform, and/or the like. Known methods of classification of paragraphs of resume documents, however, are labor-intensive and can be costly. Current approaches used in parsing of information in unstructured text rely on rules-based mechanisms that are sensitive to technical domains, language and spelling errors, and rely on long lists of binary comparisons that are run against pre-defined sets of ad-hoc rules on top of customized taxonomies and vocabularies. Such methods and devices do not scale well and reach their limits when a use context is changed or shifted (e.g., from resume parsing to job-description parsing), used in a different language, used on a new industrial field, spelling errors or disambiguation occurs, and/or the like.

Other issues arise with perishable knowledge with vocabularies and taxonomies churning fast and rule-sets requiring constant maintenance. Churn could manifest itself in the form of new positions or skill-sets emerging (e.g., "data scientist", "social media coordinator"), new terminology being introduced or deprecated (e.g. addition of "lstm" or removal of "shoe polisher"), new toolsets and frameworks are used (e.g. "mesos", "tensorflow"), neologisms and crossover of terms from different domains (e.g. "kaizen"), and/or the like. Thus, a need exists for apparatus and methods to accurately and efficiently classify models for classifying paragraphs of resume documents.

SUMMARY

In some embodiments, a method can include generating a resume document image having a standardized format, based on a resume document having a set of paragraphs. The method can further include executing a statistical model to generate an annotated resume document image from the resume document image. The annotated resume document image can indicate a bounding box and a paragraph type, for a paragraph from a set of paragraphs of the annotated resume document image. The method can further include identifying a block of text in the resume document corresponding to the paragraph of the annotated resume document image. The method can further include extracting the block of text from the resume document and associating the paragraph type to the block of text.

BRIEF DESCRIPTION OF THE DRAWINGS

FIG. 2 is a flowchart of a method of analyzing a resume document, according to an embodiment.

FIG. 3 shows a resume document image annotated by a statistical model, according to an embodiment.

FIG. 4 shows a resume document image annotated by a statistical model, according to an embodiment.

FIG. 5 shows a resume document image annotated by a statistical model, according to an embodiment.

DETAILED DESCRIPTION

Figure 1:
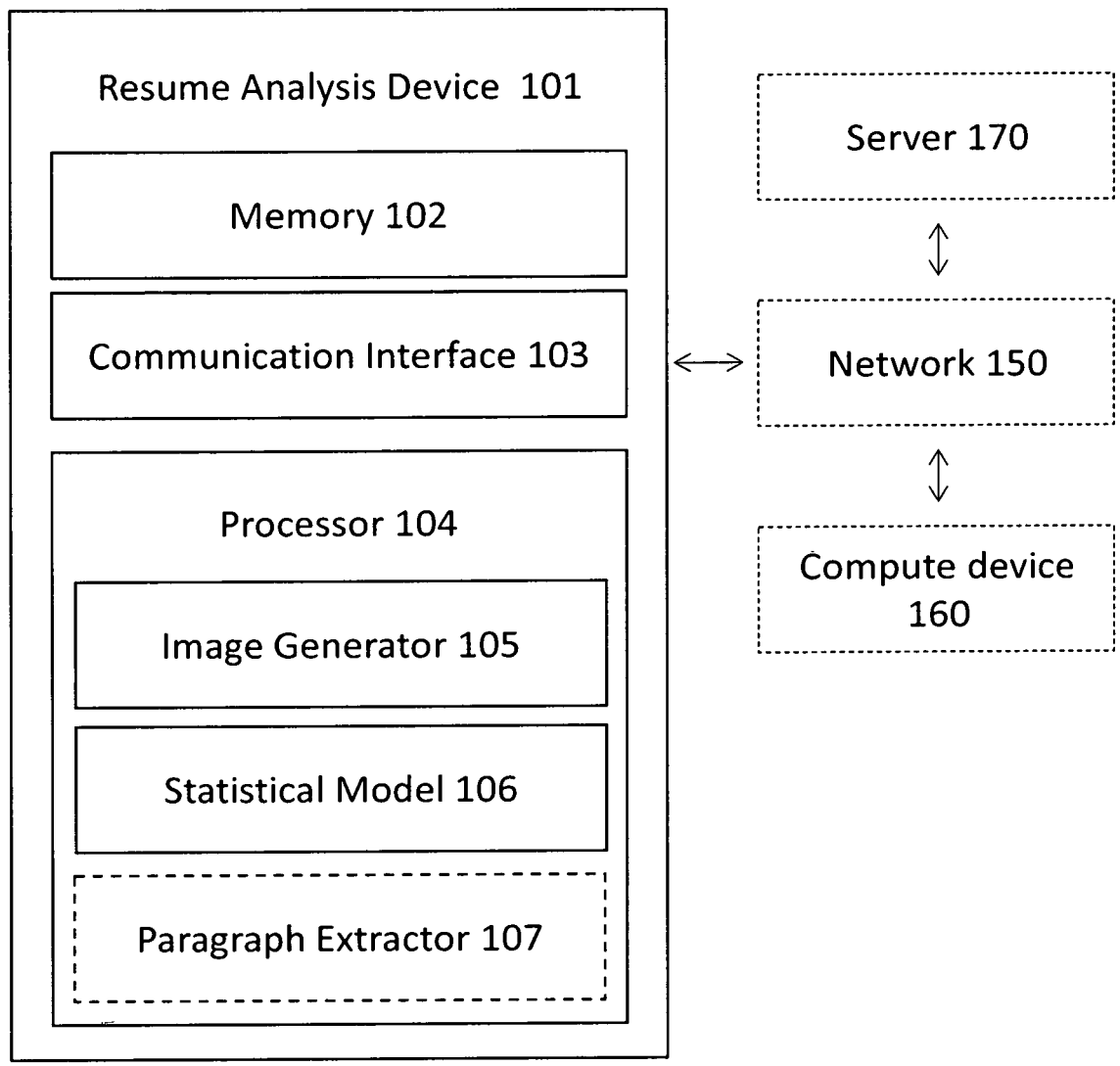
FIG. 1 is a schematic description of a resume analysis device, according to an embodiment.

Non-limiting examples of various aspects and variations of the embodiments are described herein and illustrated in the accompanying drawings.

One or more embodiments described herein generally relate to apparatus and methods for identification and/or classification of domain-specific content within structured, semi-structured, and/or unstructured documents. Apparatus and methods described herein use, for example, a statistical model to identify and/or classify paragraphs of structured, semi-structured, and/or unstructured resume document images. The documents processed by apparatus and methods described herein can be correctly classified regardless of a language(s) of and/or a spelling error(s) in the documents. In other words, the methods and apparatus described herein are independent of vocabularies used in the documents and do not need to maintain or use glossaries, taxonomies, dictionaries, and/or the like. In some embodiments, paragraph classification can be used to process, for example, document files, text files, scanned images, image files, video files, and/or the like.

Although some known resume analysis methods and apparatus use a predefined data-structure to store layout information of the document, the methods and systems described herein do not use any such predefined data-structure or rule-set before applying algorithms/statistical model(s) to annotate different paragraphs of a resume. Therefore, the resume document image analysis methods and apparatus described herein are advantageous for being agnostic to language, writing style, predefined data-structure, and/or rule-sets.

Although some known resume analysis methods and apparatus perform digital character extraction (DCE) and/or optical character recognition (OCR) to extract text from a resume document image before performing a document layout analysis (DLA) and/or identifying structures or zones within the resume document images, the methods and systems described herein do not perform any such DCE or OCR steps before annotating different paragraphs of the resume document image. Therefore, the resume document image analysis methods and apparatus described herein are advantageous not only in being agnostic to language or writing style, but also in performing fewer computation steps to analyze the resume document image.

Resume analysis devices and methods described herein are suitable for efficient and reliable classification of paragraphs of resume documents. For example, the resume analysis device and methods can classify paragraphs of the resume document by paragraph types (e.g., professional summary, experience timeline, skillsets, education history, publications, and/or the like). Resume documents can be written by individuals from a wide range of background and demographics and can vary by a style(s), a template(s), a font type(s), a font color(s), a margin(s), a language(s), a technical area(s), a personal preference(s), and/or other factors. Therefore, performing classification tasks in the domain of the resume documents can be challenging and unique to this domain. To solve this challenge, resume analysis devices and methods described herein generate standardized resume document images that are further annotated by specialized statistical models. Otherwise, using known method and devices relying on rule-based models or simple machine learning models would potentially fail to reliably classify paragraphs of the resume documents.

While the methods and apparatus are described herein as processing data from document files, text files, scanned images, image files, video files, and/or the like, in some instances a resume analysis device (e.g., resume analysis device 101 described below in connection with FIG. 1) can be used to generate the document files, the text files, the scanned images, the image files, the video files, and/or the like.

FIG. 1 is a schematic description of a resume analysis device 101, according to an embodiment. The resume analysis device 101 can be operatively coupled to a compute device 160 and/or a server 170 to transmit and/or receive data and/or analytical models via a network 150. The resume analysis device 101, the compute device 160, and the server 170 each can be/include a hardware-based computing device and/or a multimedia device, such as, for example, a computer, a desktop, a laptop, a smartphone, and/or the like.

The resume analysis device 101 includes a memory 102, a communication interface 103, and a processor 104. The resume analysis device 101 can operate an image generator 105 and/or a statistical model 106 that together can generate resume document images from resume documents, and classify paragraphs of the set of resume document images by paragraph types (e.g., professional summary, experience timeline, skillsets, education history, publications, and/or the like). In some embodiments, the resume analysis device 101 can receive data including the resume documents from a data source(s). The data source(s) can include, for example, a scanner and/or an external hard drive (both optional; not shown), the compute device 160, the server 170, each operatively coupled to the resume analysis device 101. The resume analysis device 101 can receive the data in response to a user of the resume analysis device 101 and/or the compute device 160 providing an indication to begin training the statistical model 106 based on the set of resume document images or an indication to begin classifying paragraphs of the set of resume document image. The resume analysis device 101 can receive the resume documents that are often semi-structured and/or unstructured, generate resume document images, and identify and correlate entities (e.g., company names, individual names, skills, job titles, universities, etc.) in generic text of the resume document images to extract structured and machine-indexable data.

The memory 102 of the resume analysis device 101 can be, for example, a memory buffer, a random-access memory (RAM), a read-only memory (ROM), a hard drive, a flash drive, and/or the like. The memory 102 can store, for example, the set of resume documents, the set of resume document images, and/or code that includes instructions to cause the processor 104 to perform one or more processes or functions (e.g., an image generator 105 and/or a statistical model 106). The memory 102 can store a set of files associated with (e.g., generated by executing) the first statistical model 106. For example, the set of files associated with the statistical model 106 can include temporary variables, return memory addresses, variables, a graph of the statistical model 106 (e.g., a set of arithmetic operations or a representation of the set of arithmetic operations used by the statistical model 106), the graph's metadata, assets (e.g., external files), electronic signatures (e.g., specifying a type of the statistical model 106, and the input/output tensors), and/or the like, generated during the operation of the statistical model 106.

The communication interface 103 of the resume analysis device 101 can be a hardware component of the resume analysis device 101 to facilitate data communication between the resume analysis device 101 and external devices (e.g., the network 150, the compute device 160, the server 170, and/or the like). The communication interface 103 is operatively coupled to and used by the processor 104 and/or the memory 102. The communication interface 103 can be, for example, a network interface card (NIC), a Wi-Fi® transceiver, a Bluetooth® transceiver, an optical communication module, and/or any other suitable wired and/or wireless communication interface. The communication interface 103 can be configured to connect the resume analysis device 101 to and facilitate receiving and/or transmitting data via to the network 150. For example, the communication interface 103 can facilitate receiving or transmitting the set of resume document images and/or the statistical model 106 through the network 150 from/to the compute device 160, or the server 170, each communicatively coupled to the resume analysis device 101 via the network 150.

The network 150 can be, for example, a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), a fiber optic commination channel(s), an electronic communication channel(s), and/or the like. The network 150 can be and/or include, for example, the Internet, an intranet, a local area network (LAN), and/or the like.

The processor 104 can be, for example, a hardware-based integrated circuit (IC) or any other suitable processing device configured to run or execute a set of instructions or a set of codes. For example, the processor 104 can include a general-purpose processor, a central processing unit (CPU), an application specific integrated circuit (ASIC), a graphics processing unit (GPU), and/or the like. The processor 104 is operatively coupled to the memory 102 through a system bus (for example, address bus, data bus, and/or control bus; not shown). The processor 104 includes an image generator 105 and a statistical model 106 (also referred to as 'machine learning model'). The processor 104 can further optionally include a paragraph extractor 107. Each of the image generator 105 or statistical model 106 can include software stored in the memory 102 and executed by the processor 104. For example, a code to cause the statistical model 106 to generate a set of annotated resume document images from the set of resume document images can be stored in the memory 102 and executed by the processor 104. Alternatively, each of the image generator 105 or statistical model 106 can be a hardware-based device (e.g., an integrated circuit).

The image generator 105 can receive data including resume documents and render or generate resume document images. The image generator 105 can be configured to render or generate resume document images that have a standardized format. The standardized format can establish common visual attributes such as, for example, a common background color, a common font color, a common font ligature, a common font size, a common page margin, or a common page border. Common visual attributes of the rendered or generated resume document images can help the statistical model 106 to be trained and executed more accurately and efficiently compared to when the statistical model 106 are trained and executed based on images of the resume documents as received (without standardization).

In some instances, the image generator 105 can receive and normalize the set of resume document images to a common scale to improve cost efficiency and accuracy of generating and analyzing resume document images. Normalization can involve transforming data into a common format to improve cross-compatibility of the resume document images among various processes and/or models of the resume analysis device 101. In some instances, the image generator 105 can format the set of resume document images to a common encoding format such as tagged image file format (TIFF), bitmap image file (Bitmap), joint photographic expert group (JPEG), graphics interchange format (GIF), portable network graphics (PNG), and/or the like. In some instances, the image generator 105 can format the set of resume document images to be the same image size. For example, the image generator 105 can resize each resume document image from the resume document images to a 336-pixels-by-336-pixels format, a 300-pixels-by-400 pixels format, and/or any suitable dimension. In some instances, the image generator 105 can normalize the resume document image to a same color coding. For example, in some instances, the set of images can be converted to a grayscale image.

In some instances, the image generator 105 can further generate augmented images from the resume document images to diversify representations of the set of resume document images and to increase a number of images for training the statistical model 106. In some instances, augmenting an image of resume document from the resume document images may involve manipulating brightness of the image of resume document, adding noise (e.g., a random noise) to the image of resume document, white-balancing the image of resume document, and/or the like.

The statistical model 106 (also referred to herein as the 'machine learning model') can include a set of model parameters such as weights, biases, or activation functions that can be executed to annotate and/or classify paragraphs of a resume document image or a set of resume document images. The statistical model 106 can be executed during a training phase and/or an execution phase.

In the training phase, the statistical model 106 receives training data and optimizes (or improves) the set of model parameters of the statistical model. The set of model parameters are optimized (or improved) such that paragraphs of a resume document image in the training data can be annotated and/or classified correctly with a certain likelihood of correctness (e.g., a pre-set likelihood of correctness). The training data can include the set of resume document images received from the image generator 105, and a set of representations of annotations of paragraphs associated to the set of resume document images. Each representation of annotation of a paragraph from the set of representations of annotations of paragraphs can be associated to a paragraph of a resume document image from the set of resume document images. Each representation of annotation of the paragraph can include a representation of a paragraph type and/or a representation of coordinates. The representation of the paragraph type can be or include, for example, a string variable representing the paragraph type (e.g., 'education', 'experience', etc.) or a hash representing the paragraph type (e.g., 'D0BB80', 'EA0BB8', etc.), and/or the like. The representation of coordinates can be or include, for example, two cartesian coordinates representing two opposite coordinates of a bounding box around the paragraph, two vectors (each having a magnitude and a direction) pointing to the two opposite coordinates of the bounding box around the paragraph, one cartesian coordinate and two radii of an oval of the bounding box around the paragraph, and/or the like.

In some instances, the training data can be divided into batches of data based on a memory size, a memory type, a processor type, and/or the like. In some instances, the resume document images can be divided into batches of data based on a type of the processor 104 (e.g., CPU, GPU, and/or the like), number of cores of the processor 104, and/or other characteristic of the memory 102 or the processor 104.

In some instances, the training data can be divided into a training set, a test set, and/or a validation set. For example, the training data can be randomly divided so that 60% of the training data is in the training set, 20% of the training data is in the test set, and 20% of the training data is in the validation set. The statistical model 106 can be iteratively optimized (or improved) based on the training set while being tested on the test set to avoid overfitting and/or underfitting of the training set. Once the statistical model 106 is trained based on the training set and the test set, a performance of the statistical model 106 can be further verified based on the validation set.

In the execution phase, the statistical model 106 (that is trained in the training phase) receives at least one resume document image (a resume document image(s) not among the set of resume document images used in the training phase) and annotates and/or classifies paragraphs of the at least one resume document image. Because the execution phase is performed using the set model parameters that were already optimized during the training phase, the execution phase is computationally quick.

The statistical model 106 can be or include at least one of a deep neural network model (DNN), an artificial neural network (ANN) model, a fully connected neural network, a convolutional neural network (CNN), a residual network model, a region proposal network (RPN) model, a feature pyramid network (FPN) model, a generative adversarial network (GAN), a K-Nearest Neighbors (KNN) model, a Support Vector Machine (SVM), a decision tree, a random forest, an analysis of variation (ANOVA), boosting, a Naïve Bayes classifier, and/or the like. In some instances, the CNN or a CNN-based model can be advantageous in classifying paragraphs of a resume document image by applying convolutional filters that identify and/or emphasize important features about the resume document image.

In some instances, for example, the statistical model 106 can include a custom-built model that implements neural network layers and techniques from a convolutional neural network (CNN) model, a residual network model, a region proposal network (RPN) model, and/or a feature pyramid network (FPN) model. Specifically, for example, the custom-built model can include convolutional filters of the CNN model that can be used for automatic feature extraction and that perform, for example, image classification, image segmentation, and/or the like. In addition, the custom-built model can include techniques for better connectivity between layers from a residual network model. Such techniques from the residual network model can improve the convolutional layers of the CNN model and help to increase depth of the custom-built model (e.g., increase number of layers) without overfitting the customer-built model during a training phase. Moreover, the custom-built model can include layers from the RPN model for image segmentation. For example, layers from the PRN model can receive outputs of the convolutional filters to predict, for example, bounding box coordinates, region types, paragraph coordinates, paragraph types, and/or the like. Also, the custom-built model can include techniques for better connections between various convolutional filters that would in turn allow the custom-built model to better discover filters at multiple scales such as, for example, letters, words, sentences, paragraphs, page layout, and/or the like.

In use, the resume analysis device 101 can receive a set of resume documents that are semi-structured and/or unstructured (e.g., written in a variety of templates, a variety of languages, by individual with a variety of educational background, etc.). In some instances, the resume analysis device 101 can receive, via the communication interface, the set of resume documents from the server device 170. The image generator 105 can receive the set of resume documents and generate a set of resume document images that are standardized. Furthermore, the set of resume document images can be associated with a set of representations of annotations of paragraphs. In some implementations, the set of representations of annotations of paragraphs can be prepared for the set of resume document images in response to input from an operator(s) of the resume analysis device 101, an operator(s) of the compute device 160, and/or an operator of the server device 170. Then, the resume analysis device 101 can optimize (or improve) the statistical model 106 based on the set of resume document images and the set of representations of annotations of paragraphs. The resume analysis device 101 can then receive a resume document that was not among the set of resume documents. The resume analysis device 101 can render, using the image generator 105, a resume document image based on the resume document. The machine learning model 106 can then receive the resume document image from the image generator 105 to generate an annotated resume document image that includes annotations of coordinates of each paragraph of the resume document image and classify each paragraph with a paragraph type.

In some implementations, the processor 104 can optionally include a paragraph extractor 107. The paragraph extractor 107 can identify a block of text in the resume document corresponding to (uniquely associated with) each paragraph of the annotated resume document image. The paragraph extractor 107 can then extract each block of text from the resume document and associate the paragraph type to that block of text. In one example, the extracted block of text in the resume document and/or the associated paragraph type can be displayed, for example, on a display screen of a user of the resume analysis device 101 or on a display screen of a user of the compute device 160. In another example, the extracted block of text in the resume document and the associated paragraph type can be stored in a text document.

In some instances, the extracted block of text and/or the associated paragraph type can be used to improve (or optimize) an effectiveness of a job posting. For example, the resume analysis device 101 can receive a set of resume documents (e.g., from the compute device 160 and/or the server 170) in response to a job posting. The resume analysis device 101 can execute the image generator 105, the statistical model 106, and the paragraph extractor 107 to generate a set of extracted blocks of text and/or a set of paragraph types. The resume analysis device can be further configured to analyze the set of extracted blocks of text and/or the set of paragraph types (e.g., using statistical analysis of words used in the extracted blocks of text for each paragraph type) to optimize or improve effectiveness of the job posting and/or future job postings.

In some instances, the extracted block of text and/or the associated paragraph type can be used to match a set of candidates with relevant jobs. For example, the resume analysis device 101 can receive a set of resume documents and a set of job postings. The resume analysis device 101 can generate a set of extracted blocks of text and/or a set of paragraph types, and receive a set of job descriptions from the set of job postings. The resume analysis device 101 can match one or more extracted blocks of text (e.g., each including an identification of a candidate) from the set of extracted blocks of text with one or more job descriptions from the set of job postings. Thereafter, the resume analysis device 101 can store a list matching one or more job postings from the set of job postings with one or more candidates from the set of candidates.

In some instances, the resume analysis device 101 can be configured to perform resume parsing by extracting a set of blocks of text and a set of paragraph types associated to the set of extracted blocks of text. Because the resume analysis device 101 is better than known resume analysis methods and systems in context detection and tolerance to errors/language variations in resume documents, the resume analysis device 101 can improve the quality of information extraction and can improve matching that extracted information to candidates.

In some implementations, the set of representations of annotations of paragraphs can be prepared for the set of resume document images by extracting and structuring features of the set of resume document images using deterministic and/or probabilistic techniques. For example, the set of representations of annotations of paragraphs can be prepared using specialized third-party parsing systems (accessed by the resume analysis device 101 via an application programming interface (API); not shown), feature/information extraction methods guided by predefined rule-sets integrated to the resume analysis device 101, and/or the like.

The compute device 160 can be/include a hardware-based computing device and/or a multimedia device operatively coupled to the resume analysis device 101. The compute device 160 can be configured to transmit and/or receive data and/or analytical models to/from the resume analysis device 101. For example, in some implementations, the compute device 160 can be a device at human resources office that can receive, after resume analysis device 101 training, the statistical model 106 to classify paragraphs of resume documents and/or resume document images received from a user of the compute device 160. The user device 160 can include a memory, a communication interface and/or a processor that are structurally and/or functionally similar to the memory 102, the communication interface 103 and/or the processor 104 as shown and described with respect to the resume analysis device 101.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory, a communication interface and/or a processor that are structurally and/or functionally similar to the memory 102, the communication interface 103 and/or the processor 104 as shown and described with respect to the resume analysis device 101. In some embodiments, however, the memory of the server 170 can include application specific storage (e.g., deep learning storage servers) that is structurally and/or functionally different from the memory 102. Similarly, in some implementations, the processor of the server 170 can include application specific processors (e.g., GPU rack servers) that are structurally and/or functionally different from the processor 104.

Although the resume analysis device 101, the compute device 160, and the server 170 are shown and described as singular devices, it should be understood that, in some embodiments, one or more resume analysis devices, one or more compute device, and/or one or more server devices can be used in a recognition system.

FIG. 2 is a flowchart showing a method 200 of analyzing a resume document, according to an embodiment. The method 200 used for analyzing the resume document is agnostic to language, technical field, and/or writing style. In other words, the resume document analyzed by method 200 can be written in any language, in any technical field, and/or in any writing style. In some implementations, a resume analysis device (such as the resume analysis device 101 as shown and described with respect to FIG. 1) can be used to perform the method 200. At 201, a resume document image that has a standardized format is generated based on a resume document that has a set of paragraphs. The standardized format can include, for example, a common background color, a common font color, a common font ligature, a common font size, a common page margin, a common page border, and/or the like. At 202, a statistical model is executed to generate an annotated resume document image from the resume document image. The annotated resume document image indicates a bounding box and a paragraph type, for each paragraph from a set of paragraphs of the annotated resume document image. The paragraph type can include, for example, a summary paragraph type, an experience paragraph type, an education paragraph type, a credential paragraph type, an award paragraph type, a publication paragraph type, and/or the like.

At 203, a block of text in the resume document corresponding to (uniquely associated with) the paragraph of the annotated resume document image is identified. The annotated resume document image can include coordinates and a paragraph type for each paragraph of the resume document image and the block of text in the resume document can be identified based on the coordinates of the annotate resume document image. At 204, the block of text is extracted from the resume document and the paragraph type is associated with the block of text. In some instances, the extracted block of text and the associated paragraph type can be displayed, for example, on a display screen.

In some instances, a paragraph type confidence score can be indicated (or identified). Therefore, the method 200 can optionally include associating the paragraph type confidence score to the block of text.

In some instances, the method 200 can analyze a first resume document written in a first language and a second resume document in a second language. The method 200 can generate a first resume document image and a second resume document image from the first resume document and the second resume document, respectively. The method 200 can execute the statistical model to generate a first annotated resume document image and a second annotated resume document image, each having coordinates and a paragraph type associated to each paragraph.

In some embodiments, a first statistical model can be trained to classify paragraphs of a first set of resume document image in a first language and a second statistical model can be trained to classify paragraphs of a second set of resume document image in a second language. The resume analysis device can be configured to detect an indication of a language of a document and execute the first statistical model or the second statistical model based on the indication of the language.

Figure 4:
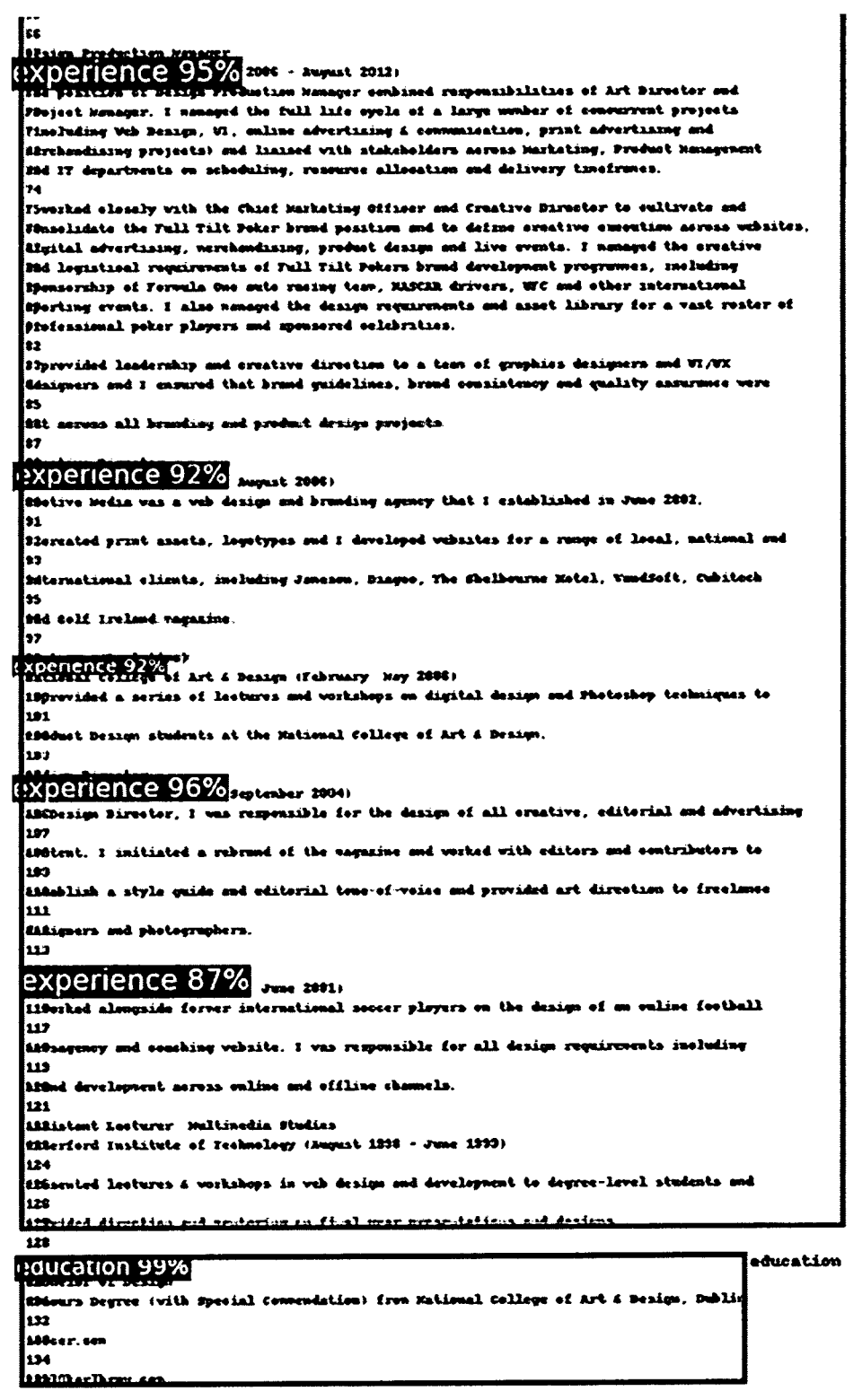

FIG. 3 and FIG. 4 show examples of resume document images annotated by a statistical model. As shown, each paragraph in a resume document image from the resume document images can be annotated by a bounding box around the paragraph, a paragraph type, and a paragraph type confidence score (a confidence score showing confidence on classification of the paragraph with the paragraph type). For example, in FIG. 3, the first paragraph is surrounded by the bounding box, identified as a "summary" paragraph type, with a paragraph type confidence score of "90%". Also in FIG. 3, the second paragraph is surrounded by a bounding box, identified as a "experience" paragraph type, with a paragraph type confidence score of "81%". In some instances, the bounding box can be color-coded with each color showing a unique paragraph type. In some instances, all the bounding boxes can have a common color while each bounding box has a color intensity indicating the paragraph type confidence score. In some implementations, the bounding box around each paragraph, the paragraph type for that paragraph, and the paragraph type confidence score for that paragraph can be marked on the resume document image and stored in the same file. In some implementations, the bounding box around each paragraph, the paragraph type for that paragraph, and the paragraph type confidence score for that paragraph can be associated with the resume document image and stored in a separate file.

FIG. 5 shows an example of a resume document image annotated by a statistical model. As shown, each paragraph in the resume document image can be annotated by a bounding box around the paragraph, a set of coordinates pointing to corners of the bounding box, and a paragraph type. In some instances, each bounding box can be color-coded with a color showing a unique paragraph type. In this example of FIG. 5, each paragraph is surrounded by a different shaded bounding box: the first bounding box is in a light shade, the second bounding box is in a medium shade and the third bounding box is in a dark shade.

Also shown in FIG. 5, each bounding box includes a representation of coordinates for the upper left corner and a representation of coordinates in the lower right corner. A first bounding box includes the first paragraph type "BRIEF", the first representation of coordinate for the upper left corner (x1, y1), and the second representation of coordinate for the lower right corner (x2, y2), for the first paragraph. The second bounding box includes the second paragraph type "EXPERIENCE", the third representation of coordinate for the upper left corner (x3, y3), and the fourth representation of coordinate for the lower right corner (x4, y4) for the second paragraph. The third bounding box includes the third paragraph type "EDUCATION", the fifth representation of coordinate for the upper left corner (x5, y5) and the sixth representation of coordinate for the lower right corner (x6, y6) for the third paragraph. In some implementations, the bounding box around each paragraph, the set of coordinates pointing to corners of that bounding box, and the paragraph type of the paragraph can be marked on the resume document image and stored in the same file. In some implementations, the bounding box around each paragraph, the set of coordinates pointing to corners of the bounding box of that paragraph, and the paragraph type of that paragraph can be associated with the resume document image and stored in a separate file. FIG. 5 also shows an example of a resume document image having a language other than English, here Latin. Thus, the statistical model used to generate the example shown in FIG. 5 was trained using resumes in relevant language (here, Latin).

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    generating a resume document image having a standardized format, based on a resume document having a plurality of paragraphs;
    executing a statistical model to generate an annotated resume document image from the resume document image, the annotated resume document image indicating a bounding box and a paragraph type, for a paragraph from a plurality of paragraphs of the annotated resume document image, the statistical model being trained, before the executing, based on (1) a plurality of resume document images not including the resume document image and (2) a plurality of annotated resume document images not including the annotated resume document image;
    identifying a block of text in the resume document corresponding to the paragraph of the annotated resume document image; and
    extracting the block of text from the resume document and associating the paragraph type to the block of text.

2. The method of claim 1, wherein the standardized format includes at least one of a common background color, a common font color, a common font ligature, a common font size, a common page margin, or a common page border.

3. The method of claim 1, wherein the paragraph type includes a summary paragraph type, an experience paragraph type, an education paragraph type, a credential paragraph type, an award paragraph type, or a publication paragraph type.

4. The method of claim 1, wherein the annotated resume document image further indicates a paragraph type confidence score, the method further includes associating the paragraph type confidence score to the block of text.

5. The method of claim 1, wherein the resume document is a first resume document in a first language, the resume document image is a first resume document image, the annotated resume document image is a first annotated resume document image, the method further comprising:
    generating a second resume document image having the standardized format and a plurality of paragraphs, based on a resume document in a second language; and
    executing the statistical model to generate a second annotated resume document image from the second resume document image.

6. The method of claim 1, wherein the standardized format includes a common background color, a common font color, a common font ligature, a common font size, a common page margin, and a common page border.

7. A non-transitory processor-readable medium storing code representing instructions to be executed by a processor of a first compute device, the code comprising code to cause the processor to:
    receive, from a second compute device remote from the first compute device, a statistical model trained, at the second compute device, based on (1) a plurality of resume document images having a standardized format and (2) a plurality of annotated resume document images;
    receive a resume document having a plurality of paragraphs;
    generate a resume document image, not included within the plurality of resume document images, having the standardized format, based on the resume document;
    execute the statistical model to generate an annotated resume document image from the resume document image, the annotated resume document image (1) indicating a bounding box and a paragraph type, for a paragraph from the plurality of paragraphs of the annotated resume document image, and (2) not included in the plurality of annotated resume document images;
    identify a block of text in the resume document corresponding to the paragraph of the annotated resume document image; and
    extract the block of text from the resume document and associate the paragraph type to the block of text.

8. The non-transitory processor-readable medium of claim 7, wherein the standardized format includes at least one of a common background color, a common font ligature, a common font size, a common page margin, or a common page border.

9. The non-transitory processor-readable medium of claim 7, wherein the standardized format includes at least one of a common background color, a common font color, a common font ligature, a common font size, a common page margin, or a common page border.

10. The non-transitory processor-readable medium of claim 7, wherein the paragraph type includes at least one of a summary paragraph type, an experience paragraph type, an education paragraph type, a credential paragraph type, an award paragraph type, or a publication paragraph type.

11. The non-transitory processor-readable medium of claim 7, wherein the annotated resume document image further indicates a paragraph type confidence score, the method further includes associating the paragraph type confidence score to the block of text.

12. The non-transitory processor-readable medium of claim 7, wherein the resume document is a first resume document in a first language, the resume document image is a first resume document image, the annotated resume document image is a first annotated resume document image, the medium further comprising code to:
    receive a second resume document in a second language, the second resume document having a plurality of paragraphs;
    generate a second resume document image having the standardized format, based on the resume document; and
    execute the statistical model to generate a second annotated resume document image from the second resume document image.

13. The non-transitory processor-readable medium of claim 7, wherein the bounding box is a rectangle defined by two coordinates of two opposite corners of the rectangle.

14. A method, comprising:
- receiving a plurality of resume documents, each resume document from the plurality of resume documents having a plurality of paragraphs;
- generating a plurality of resume document images having a standardized format, based on the plurality of resume documents, each resume document image from the plurality of resume document images having a plurality of paragraphs;
- annotating, for each resume document images from the plurality of document images, the plurality of paragraphs of the plurality of resume document images with a plurality of bounding boxes to generate a plurality of annotated resume document images, each bounding box from the plurality of bounding boxes indicating at least a cartesian coordinate and a paragraph type from a plurality of paragraph types;
- training a statistical model based on the plurality of resume document images and the plurality of annotated resume document images;
- receiving a resume document not included within the plurality of resume documents;
- generating a resume document image having the standardized format, based on the resume document not included within the plurality of resume documents; and
- executing, after training, the statistical model to generate an annotated resume document image based on the resume document image not included within the plurality of annotated resume document images, the annotated resume document image indicating a bounding box and a paragraph type, for each paragraph of the resume document image.

15. The method of claim 14, further comprising:
- identifying, for a paragraph of the annotated resume document image, a block of text corresponding to the paragraph of the annotated resume document image, in the resume document not included within the plurality of resume documents; and
- extracting the block of text from the resume document not included within the plurality of resume documents and associating the paragraph type for the paragraph of the annotated resume document image to a paragraph type of the block of text.

16. The method of claim 14, wherein the standardized format includes at least one a common background color, a common font color, a common font ligature, a common font size, a common page margin, or a common page border.

17. The method of claim 14, wherein the plurality of paragraph types include at least two of a summary paragraph type, an experience paragraph type, an education paragraph type, a credential paragraph type, an award paragraph type, or a publication paragraph type.

18. The method of claim 14, wherein the annotated resume document image further indicates a paragraph type confidence score.

19. The method of claim 14, wherein the resume document not included within the plurality of resume documents is a first resume document in a first language, the resume document image is a first resume document image, the annotated resume document image is a first annotated resume document image, the method further comprising:
- receiving a second resume document in a second language, the second resume document having a plurality of paragraphs;
- generating a second resume document image having the standardized format, based on the second resume document; and
- executing, after training, the statistical model to generate a second annotated resume document image based on the second resume document image.

20. The method of claim 14, wherein the bounding box is a rectangle defined by two coordinates of two opposite corners of the rectangle.

* * * * *